(12) United States Patent
Sen et al.

(10) Patent No.: US 9,309,424 B2
(45) Date of Patent: Apr. 12, 2016

(54) MEDIA SHEET COATINGS

(71) Applicant: Hewlett-Packard Development Company, L.P., Fort Collins, CO (US)

(72) Inventors: Rhadha Sen, San Diego, CA (US); Richard J. McManus, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 26 days.

(21) Appl. No.: 13/953,118

(22) Filed: Jul. 29, 2013

(65) Prior Publication Data

US 2013/0310504 A1 Nov. 21, 2013

Related U.S. Application Data

(62) Division of application No. 11/726,645, filed on Mar. 22, 2007, now abandoned.

(51) Int. Cl.
| | |
|---|---|
| *C09D 11/00* | (2014.01) |
| *C08K 3/26* | (2006.01) |
| *C09D 11/322* | (2014.01) |
| *B41M 5/52* | (2006.01) |
| *D21H 19/44* | (2006.01) |
| *D21H 19/38* | (2006.01) |
| *D21H 19/84* | (2006.01) |
| *D21H 21/52* | (2006.01) |

(52) U.S. Cl.
CPC ........... *C09D 11/322* (2013.01); *B41M 5/5218* (2013.01); *D21H 19/44* (2013.01); *D21H 19/385* (2013.01); *D21H 19/84* (2013.01); *D21H 21/52* (2013.01)

(58) Field of Classification Search
CPC .... B41M 5/5218; C09D 11/322; D21H 19/44
USPC .......................................................... 524/425
See application file for complete search history.

(56) References Cited

U.S. PATENT DOCUMENTS

| | | | |
|---|---|---|---|
| 3,476,576 A | 11/1969 | Sennett et al. | |
| 5,057,570 A | 10/1991 | Miller et al. | |
| 5,643,631 A | 7/1997 | Donigian et al. | |
| 5,783,038 A | 7/1998 | Donigian et al. | |
| 6,414,065 B1 | 7/2002 | Boylan | |
| 6,440,537 B1 | 8/2002 | Chu et al. | |
| 6,441,076 B1 | 8/2002 | Boylan | |
| 6,514,601 B1 | 2/2003 | Sadasivan et al. | |
| 6,641,875 B2 | 11/2003 | Sadasivan et al. | |
| 6,699,538 B2 | 3/2004 | Lawrence et al. | |
| 2004/0255820 A1 | 12/2004 | Chen et al. | |
| 2006/0137574 A1 | 6/2006 | Preston et al. | |
| 2006/0210730 A1 | 9/2006 | Howe et al. | |
| 2008/0124500 A1 | 5/2008 | Courtenay et al. | |
| 2009/0131570 A1 | 5/2009 | Schliesman et al. | |

FOREIGN PATENT DOCUMENTS

| | | | | |
|---|---|---|---|---|
| EP | 0790135 | * | 8/1997 | .............. B41M 5/00 |
| JP | 07017127 | | 1/1995 | |
| JP | 2002326445 | | 11/2002 | |
| JP | 2005066925 | | 3/2005 | |
| JP | 2006272655 | | 10/2006 | |

* cited by examiner

*Primary Examiner* — David W Wu
*Assistant Examiner* — Marie Reddick
(74) *Attorney, Agent, or Firm* — Thorpe, North & Western L.L.P.

(57) ABSTRACT

A coating for a substrate is formed by milling cationic pigment particles in the presence of a water-soluble polymer, where the water-soluble polymer acts as a binder and a dispersant for the cationic pigment particles.

17 Claims, 2 Drawing Sheets

MEDIA SHEET COATINGS

The present application is a divisional of U.S. application Ser. No. 11/726,645, now abandoned, filed on Mar. 22, 2007.

BACKGROUND

Inorganic pigments, such as calcium carbonate pigment particles, are often dispersed in a solvent, such as water, to form a liquid coating that when applied to a substrate, such as paper, and subsequently dried forms an image-receiving layer. A binder is usually added to the liquid coating to adhere the calcium carbonate particles to each other and to the substrate after the coating is dried. The calcium carbonate particles produce a glossy layer with absorption suitable for inkjet printing.

The liquid coating is often formed from an anionic dispersion (or slurry) of ground or precipitated calcium carbonate pigment particles. However, inkjet ink is typically anionic so inkjet ink has trouble adhering to an image-receiving layer made from an anionic dispersion of calcium carbonate pigment particles. Therefore, the anionic dispersion of calcium carbonate pigment particles is typically converted to a cationic dispersion by adding an excess of highly charged cationic dispersant to the anionic dispersion of calcium carbonate pigment particles. During the process of charge conversion, however, the viscosity of the dispersion may increase and flocculation may occur.

Calcium carbonate pigment particles, either with a cationic or anionic charge, are often too large, as received, for producing gloss levels suitable for photographic printing, such as can be obtained using fumed or gelled alumina or silica. Therefore, the calcium carbonate pigment particles are often milled, in slurry form, to produce sufficiently small particles. Before applying the slurry of ground calcium carbonate pigment particles to a substrate to form an image-receiving layer, a binder is usually added to the slurry of ground calcium carbonate pigment particles, as a separate process step, so that the calcium carbonate particles adhere each other and to the substrate after the slurry is dried.

DETAILED DESCRIPTION

In the following detailed description of the present embodiments, reference is made to the accompanying drawings that form a part hereof, and in which are shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
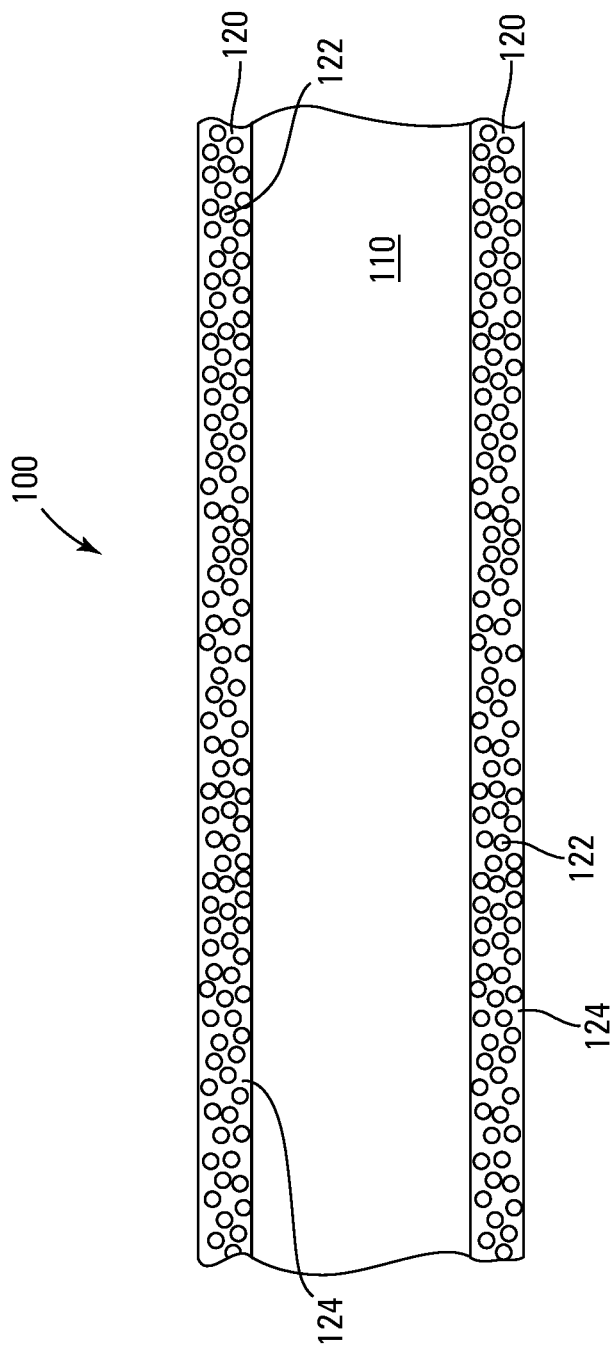
FIG. 1 is a cross-sectional view of an embodiment of media sheet, according to an embodiment of the disclosure.

FIG. 1 is a cross-sectional view of a media sheet 100, such as a photographic-grade media sheet, e.g., suitable for use in an imaging device, such as a color inkjet printer, according to an embodiment. Media sheet 100 includes a substrate 110, such as of paper, e.g., fabric paper stock, or the like. An image-receiving layer (or coating) 120 is formed on substrate 110 by applying an aqueous liquid coating on substrate 110 and subsequently drying the liquid coating. For one embodiment, image-receiving layer 120 is formed either on opposing (upper and lower) surfaces of substrate 110, as shown, or on one of the surfaces of substrate 110.

For one embodiment, image-receiving layer 120 has a 60-degree gloss level of about 20 to about 30 as measured at a 60-degree view angle. The gloss of the image-receiving layer can be achieved through, but is not limited to, such processes as calendering, super-calendering, and casting of the image-receiving layer 120. For another embodiment, image-receiving layer 120 has a dry coat weight of about 5 to about 60 gram/m$^2$. Note that image-receiving layer 120 is the outermost layer of media sheet 100. For one embodiment, image-receiving layer 120 receives marking fluid, e.g., liquid inkjet ink droplets, ejected from an imaging device during a printing process.

For one embodiment, image-receiving layer 120 includes cationic pigment particles 122, such as cationic calcium carbonate pigment particles. For one embodiment, the calcium carbonate pigment particles have a primary particle size corresponding to a mean esd (equivalent spherical diameter) of about 10 to about 30 nanometers. For another embodiment, cationic pigment particles 122 act to provide an absorption characteristic of image-receiving layer 120 so that inkjet ink ejected onto image-receiving layer 120 is sufficiently dry after an imaging device has finished disposing images on image-receiving layer 120. For another embodiment, cationic pigment particles 122 absorb the ink vehicle (or carrier) of inkjet ink and retain the colorant of the inkjet ink at or near the surface of image-receiving layer 120. For another embodiment, each gram of image-receiving layer 120 can absorb about 0.34 to about 0.63 of gram of water. For another embodiment, cationic pigment particles 122 also act to provide a gloss characteristic of image-receiving layer 120. For one embodiment, the cationic pigment particles are about 80 to about 95 percent by dry weight of image receiving layer 120.

For one embodiment, image-receiving layer 120 may also include a binder 124 that binds the cationic pigment particles 122 to each other and to substrate 110 after the liquid coating that forms image-receiving layer 120 is dried. For one embodiment, binder 124 is formed from a nonionic water-soluble polymer, e.g., polyvinyl alcohol, that acts as a dispersant for cationic pigment particles 122 when cationic pigment particles 122 are dispersed in the liquid coating that forms image-receiving layer 120 and that acts as the binder after the liquid coating is dried. Suitable polyvinyl alcohols may include PVA 321 and PVA 205 (from Air Products and Chemicals, Inc., Allentown, Pa., U.S.A.), PVP K-15 (from International Specialty Products, Wayne, N.J., U.S.A.), WO 320R (from Nippon Goshei, Osaka, Japan), and Mowiol 1596, Mowiol 1888, Mowiol 698, Mowiol 1599, and Mowiol 1579 (from Kuraray Co., Ltd., Frankfurt, Germany). Additives, such as colorants, optical brighteners, defoamers, wetting agents, rheology modifiers and other additives known in the art, may be added to the liquid coating for some embodiments.

For one embodiment, forming media sheet 100 involves forming the liquid coating that forms image-receiving layer 120, e.g., as an aqueous suspension that includes cationic pigment particles 122, e.g., cationic calcium pigment particles, and binder 124, e.g., polyvinyl alcohol. For one embodiment, the liquid coating may also contain the colorants, optical brighteners, defoamers, wetting agents, rheology modifiers, etc.

Suitable cationic calcium carbonate particles are available as a ground or precipitated dry powder or as aqueous slurry. For one embodiment, the ground cationic calcium carbonate powder particles have a mean esd of about 5 to about 10 microns, and the precipitated calcium carbonate powder particles particles have a mean esd of about 1 to about 2 microns. A non-limiting example of suitable ground cationic calcium carbonate powder particles is OMYACARB from Omya AG located in Oftringen, Switzerland. A non-limiting example of suitable slurry of precipitated calcium carbonate particles is JET COAT 30 from Minerals Technologies Inc. located in Bethlehem, Pa., U.S.A. Another example of a suitable cationic calcium carbonate slurry is HYDROCARB HOME 17% Solid available from Omya AG, for which the calcium carbonate particles have a mean esd of about 2 microns.

For one embodiment, the calcium carbonate particles may be received as anionic calcium carbonate particles, e.g., as ground anionic calcium carbonate particles or as precipitated anionic calcium carbonate particles. Subsequently, the anionic calcium carbonate particles are converted to cationic calcium carbonate particles using a cationic converter, such as a cationic polymer, and used for image-receiving layer 120. Non limiting examples of suitable ground anionic calcium carbonate particles that can be converted to cationic calcium carbonate particles include the COVERCARB and HYDROCARB, such as HYDROCARB 60, family of products from Omya AG, the VICRON family of products from Minerals Technologies, Inc., and the HUBERCARB family of products from J.M. Huber Corporation, Edison, N.J., U.S.A. Non limiting examples of suitable precipitated anionic calcium carbonate particles that can be converted to cationic calcium carbonate particles include the OPACARB, e.g., OPACARB A40, ALBACAR, ALBAFIL, MEGAFIL, and ALBAGLOS family of products from Minerals Technologies Inc. and the SOCAL and WINNIFIL family of products available from Solvay Advanced Functional Minerals located in Angera, Italy.

For one embodiment, the anionic calcium carbonate particles can be slurried and cationic converted using a cationic converter, such as cationic polymer, amine containing phosphonic acids, or cationic surfactant. Non-limiting examples of cationic polymers include Polyethylene Imine, POlethylene Amine, PolyDADMAC, Styrene Maleic Anhydride Imide. Non-limiting examples of amine containing phosphonic acids include Nitrilo tris (methylene phosphonic acid) Ethylenediamine tetra(methylene phosphonic acid) Hydroxy ethane-1,1-diphosphonic acid Ethanol amine bis-(methylene phosphonic acid) N,N-dimethylene phosphonic acid, Hexamethylene diamine tetra (methylene phosphonic acid). Non-limiting examples of cationic surfactants include quarternary ammonium chlorides, quarternary ammonium bromide, etc. The resulting cationic calcium carbonate particles can be subsequently mixed with the nonionic water-soluble polymer, e.g., polyvinyl alcohol, and ground in a mill as described below.

Since the cationic calcium carbonate particles are considerably larger than the calcium carbonate pigment particles of image-receiving layer 120 that have a primary particle size corresponding to a mean esd of about 10 to about 30 nanometers, the cationic calcium carbonate powder particles are milled until they reach the desired size. For one embodiment, milling the cationic calcium carbonate particles as slurry in a bead (or ball) mill accomplishes this. For other embodiments, the bead mill uses YTZ (yttrium stabilized zirconium) beads with a diameter of about 0.1 to about 0.3 of a millimeter. For another embodiment, the slurry may be recirculated out of the bead mill to a tank out side of the mill and back into the bead mill to create cationic calcium carbonate particles of a uniform size. For one embodiment, the desired primary particle size of the cationic calcium carbonate particles may be achieved in about 90 to about 300 minutes of milling. For one embodiment, milling produces aggregate cationic calcium carbonate particles with an aggregate particle size corresponding to a mean esd of about 60 to about 150 nanometers.

When the cationic calcium carbonate particles are received as a dry powder, the dry calcium carbonate powder is dispersed in water to produce slurry, and this slurry is added to the bead mill for milling. Note that when the cationic calcium carbonate particles are received as slurry, the slurry can be added directly to the mill without further processing for some embodiments. For other embodiments, the cationic calcium carbonate particles are formed from anionic calcium carbonate particles before there are added to the mill by slurrying the anionic calcium carbonate particles and converting the slurried anionic calcium carbonate particles into cationic calcium carbonate particles, e.g., using a cationic polymer, as described above. For another embodiment, the polyvinyl alcohol is also added to the bead mill so that the cationic calcium carbonate particles are milled in the presence of the polyvinyl alcohol. The polyvinyl alcohol acts as a dispersant for the cationic calcium carbonate particles during milling and acts to keep the cationic calcium carbonate particles dispersed in coating while the coating is applied to the substrate 110. The polyvinyl alcohol also acts as binder 124 when the coating is dried.

Milling the cationic calcium carbonate particles in the presence of the polyvinyl alcohol enables the liquid coating that forms image-receiving layer 120 to be formed during milling without additional processing. That is, liquid output from the mill includes an aqueous dispersion of cationic calcium carbonate particles and polyvinyl alcohol that can be applied directly to substrate 110, thus eliminating the separate process step of adding the binder after milling, as is typically done in conventional processes. Note that, for another embodiment, the colorants, optical brighteners, defoamers, wetting agents, or rheology modifiers or combinations thereof may also be added to the mill and milled with the cationic calcium carbonate particles and polyvinyl alcohol.

Figure 2:
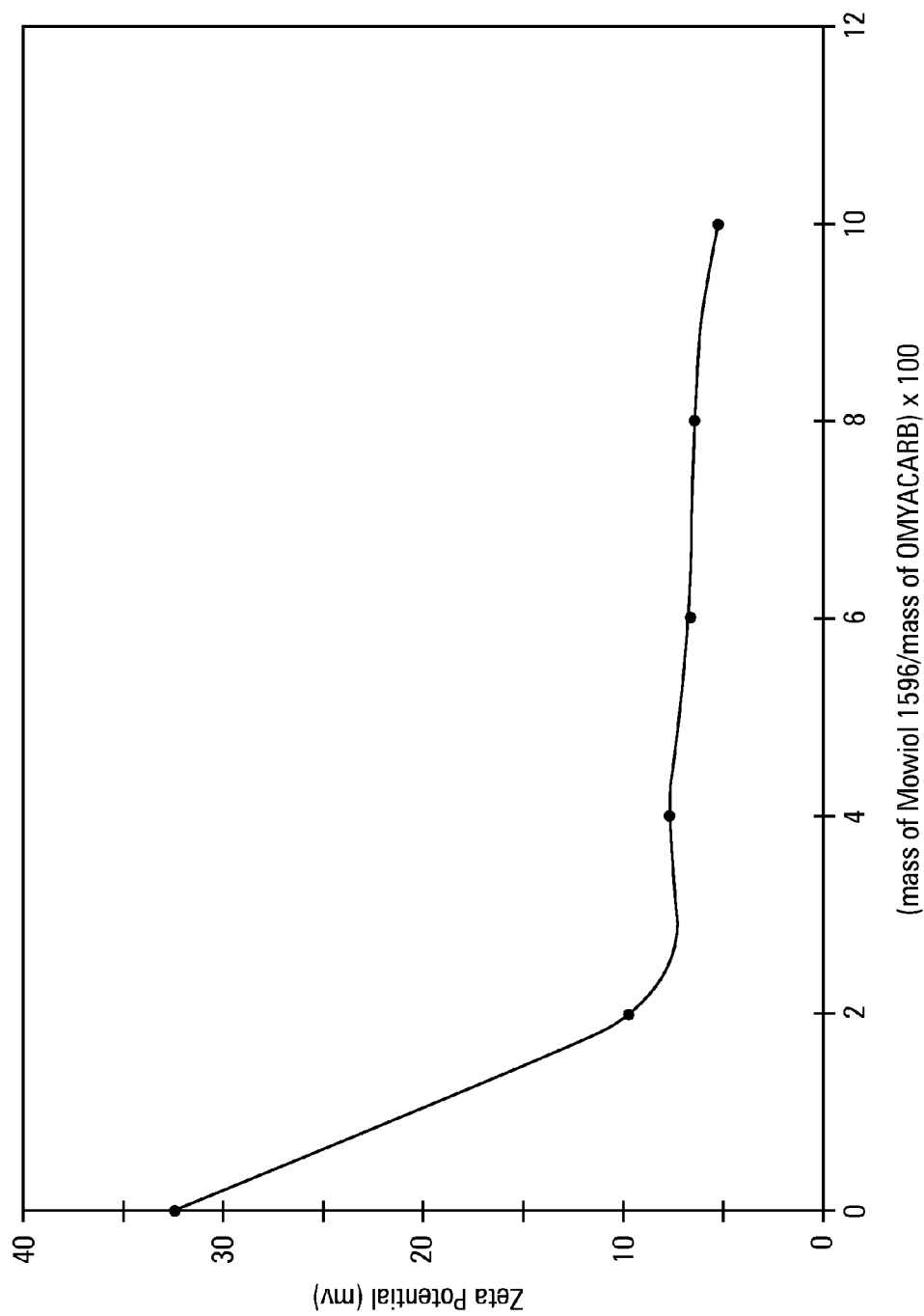
FIG. 2 is a plot illustrating the effect of different amounts of a dispersant/binder on a zeta potential of particles of an embodiment of a coating of a media sheet.

During milling, the polyvinyl alcohol is adsorbed onto the cationic calcium carbonate particles to effectively encapsulate the cationic calcium carbonate particles. This is illustrated in FIG. 2 for Mowiol 1596 (nonionic polyvinyl alcohol) and OMYACARB (cationic calcium carbonate) dispersed in water. Specifically, FIG. 2 presents the zeta potential of the particles within the water for different weight percents of Mowiol 1596. As will be appreciated by those of skill in the art, the zeta potential is the charge at the interface between the particle surface and its liquid medium, water in this example. When there is no Mowiol 1596, there are only OMYACARB particles dispersed in the water, and the zeta potential is about 33 millivolts due to the cationic charge of the OMYACARB particles. When Mowiol 1596 is added, the zeta potential drops substantially, as shown in FIG. 2. It is believed that the adsorption of the nonionic Mowiol 1596 onto the cationic OMYACARB particles produces the drop in zeta potential.

The polyvinyl alcohol adsorbed onto the calcium carbonate particles forms steric layers on the surfaces of the cationic calcium carbonate particles. The polyvinyl alcohol provides steric stabilization that acts to reduce the likelihood of the cationic calcium carbonate particles from coming out of solution. That is, the polyvinyl alcohol acts to reduce the likelihood of flocculation of the cationic calcium carbonate particles or the formation of flocs of the cationic calcium carbonate particles within the liquid coating and thus acts to disperse the cationic calcium carbonate particles throughout the liquid coating.

For various embodiments, the liquid coating, as received directly from the bead mill, can applied to substrate 110 by roll-coating, conventional slot-die processing, blade coating, bent-blade coating, rod coating, shear-roll coating, reverse-roll coating, slot-die cascade coating, pond coating, curtain coating, air-knife coating, gravure coating, size-pressing coating, brushing coating, and/or other comparable methods, including those that use circulating and non-circulating coating technologies. For some embodiments, spray-coating, immersion-coating, and/or cast-coating techniques may be used.

Subsequently, the liquid coating is dried, e.g., using infrared heating or heated air or a combination thereof to form image-receiving layer 120. Other conventional drying methods and equipment can also be used as known in the art. After drying, for one embodiment, substrate 110 with image-receiving layer 120 formed thereon is passed between a pair of rollers, as part of a calendering process. The calendering device can be a separate super-calendering machine, an on-line, soft-nip calendering machine, an off-line, soft-nip calendering machine, or the like.

CONCLUSION

Although specific embodiments have been illustrated and described herein it is manifestly intended that the scope of the claimed subject matter be limited only by the following claims and equivalents thereof.

What is claimed is:

1. A method of forming a coating for a substrate, comprising:
    milling cationic calcium carbonate particles in the presence of a polyvinyl alcohol, wherein the polyvinyl alcohol acts as a binder and a dispersant for the cationic calcium carbonate particles.
2. The method of claim 1, wherein a bead mill is used to mill the cationic calcium carbonate particles in the presence of the polyvinyl alcohol.
3. The method of claim 2, wherein beads of the bead mill are about 0.1 to about 0.3 of a millimeter in diameter.
4. The method of claim 1, wherein the polyvinyl alcohol is a nonionic polyvinyl alcohol.
5. The method of claim 1 further comprising adding the cationic calcium carbonate particles to a mill as a slurry.
6. The method of claim 1 further comprising dispersing the cationic calcium carbonate particles in water before milling the cationic calcium carbonate particles in the presence of the polyvinyl alcohol.
7. The method of claim 1, wherein the polyvinyl alcohol adsorbs onto the cationic calcium carbonate particles during milling.
8. The method of claim 1, wherein milling the cationic calcium carbonate particles produces cationic particles with a primary particle size corresponding to a mean equivalent spherical diameter of about 10 to about 30 nanometers.
9. The method of claim 1, wherein milling the cationic calcium carbonate particles produces aggregate cationic particles with an aggregate particle size corresponding to a mean equivalent spherical diameter of about 60 to about 150 nanometers.
10. The method of claim 1 further comprising forming the cationic calcium carbonate particles from anionic calcium carbonate particles before milling.
11. The method of claim 10, wherein forming the cationic calcium carbonate particles from anionic calcium carbonate particles comprises using a cationic converter.
12. The method of claim 11, wherein the cationic converter is selected from the group consisting of cationic polymers, amine containing phosphonic acids, and cationic surfactants.
13. A method of forming a coating for a substrate, comprising:
    adding a slurry of cationic calcium carbonate particles to a bead mill;
    adding nonionic polyvinyl alcohol to the bead mill;
    milling the cationic calcium carbonate particles in the presence of the nonionic polyvinyl alcohol; and
    during milling, adsorbing the nonionic polyvinyl alcohol onto the surfaces of the cationic calcium carbonate particles so as to disperse the cationic calcium carbonate particles in the coating;
    wherein the nonionic polyvinyl alcohol further acts as a binder for the cationic pigment particles when the coating is dried.
14. The method of claim 13, wherein the bead mill comprises yttrium stabilized zirconium beads of about 0.1 to about 0.3 of a millimeter in diameter.
15. The method of claim 13, wherein adsorbing the nonionic polyvinyl alcohol onto the surfaces of the cationic calcium carbonate particles acts to reduce the likelihood of flocculation of the cationic calcium carbonate particles.
16. The method of claim 13 further comprising adding colorants, optical brighteners, defoamers, wetting agents, rheology modifiers, or combinations thereof to the mill and milling the colorants, optical brighteners, defoamers, wetting agents, rheology modifiers, or combinations thereof with the calcium carbonate particles and polyvinyl alcohol.
17. The method of claim 13 further comprising forming the slurry of cationic calcium carbonate particles from anionic pigment particles before adding the slurry of cationic calcium carbonate particles to the bead mill.

\* \* \* \* \*